Jan. 17, 1967     R. C. KOZA     3,298,351

SCALE PLATE MOUNTING SYSTEM FOR EDGEWISE INSTRUMENT

Filed July 1, 1964

INVENTOR
RUSSELL C. KOZA
BY, W. J. Shanley Jr.
ATTORNEY

United States Patent Office 3,298,351
Patented Jan. 17, 1967

3,298,351
SCALE PLATE MOUNTING SYSTEM FOR EDGEWISE INSTRUMENT
Russell C. Koza, Lynnfield Center, Mass., assignor to General Electric Company, a corporation of New York
Filed July 1, 1964, Ser. No. 379,493
6 Claims. (Cl. 116—129)

This invention relates to edgewise instruments and more particularly to a system for mounting the scale plates of edgewise instruments.

Edgewise instruments are characterized by the use of arcuate scale plates in cooperation wtih pointers having indicating portions which travel in arcuate paths. As is well known, parallax reading errors are minimized by shaping the scale plate so that it is equidistant from the axis of rotation of the pointer throughout its entire range of travel and by positioning its indicating portion in close proximity to the scale plate. Prior art instruments achieve this type of close control of the shape and position of scale plates by preforming the scale plate into the desired arcuate configuration or by securing a flat, flexible scale plate to a preformed arcuate supporting member. Each of these systems has its drawbacks. The first system which depends upon a preformed scale plate is difficult to manufacture since it requires the scale printing operation to take place either prior to the forming operation or after the forming operation has been completed. In either case, this has proved to be difficult since it is difficult to protect a completed scale from damage during a forming operation, just as it is difficult to perform a printing operation upon a scale plate after it has been formed into its final arcuate shape. It is thus seen to be clearly preferable to utilize flat scale plate which are formed into the desired arcuate shape during the mounting operation. However, prior art systems of this type have been found to suffer the disadvantage that the mounting is accomplished in such a manner as to prohibit the later removal of the scale plate without first removing the meter mechanism from the case. This is detrimental from a service aspect since the removal of the meter movement from the instrument case, especially in shielded case meters, necessitates the recalibration and balancing of the meter movement when the movement is returned to the meter case. Furthermore, it would be highly desirable from a manufacturing standpoint to provide a scale plate mounting system for an edgewise instrument such that scale plates could be readily added to the completed instrument with the movement already in place within the case without disturbing the meter movement and without injuring the instrument pointer. Such a mounting system would be highly desirable for original equipment manufacturers, who utilize such instruments, since it would permit the stocking of one standard instrument and the later addition of any one of a plurality of interchangeable meter scales to obtain the desired instrument.

It is therefore an object of this invention to provide a new and improved scale plate mounting system for an edgewise instrument.

It is another object of this invention to provide a new and improved scale plate mounting system for an edgewise instrument which is characterized by the automatic shaping of a flat, resilient scale plate into the desired arcuate configuration during the assembly operation.

It is yet another object of this invention to provide a scale plate mounting assembly which will permit the scale plate to be added to, or withdrawn from, a completed edgewise instrument without necessitating the removal of the meter movement from the instrument case.

These and other objects and advantages of my invention will become apparent as this description proceeds, and the features of novelty which characterize this invention will be pointed out with particularity in the claims annexed to and forming a part of this specification.

In accordance with the preferred embodiment of the invention, a scale plate having a scale-bearing portion and two opposed end portions is formed from a flat piece of resilient material upon which the scale is printed after the forming operations upon the end portions of the scale plate have been completed. In accordance with the invention, the resulting scale plate is mounted by advancing the end portions of the scale plate in a direction parallel to the axis of movement of the meter movement into the ends of two slots provided in the forward edge of two opposed sides of the meter case. These slots are positioned such that the scale-bearing portion of the plate has to be manually bent so as to assume the desired arcuate shape in order to permit the end portions of the scale plate to enter the ends of the corresponding slots. The end portions of the scale plate are shaped relative to their corresponding slots to prevent the end portions from moving in a direction normal to the axis of rotation of the meter movement once the end portions of the scale plate are in place in the slots. Provisions are also made to determine the final location of the scale plate within the slots and the axis of rotation of the meter movement; end portions of the scale plate equal to the spacing between two planar internal surfaces of the transparent face plate cover which slides over the scale plate and completes the front of the meter case.

For a better understanding of this invention, reference may be had to the following description taken in connection with the accompanying drawing in which.

Figure 1:
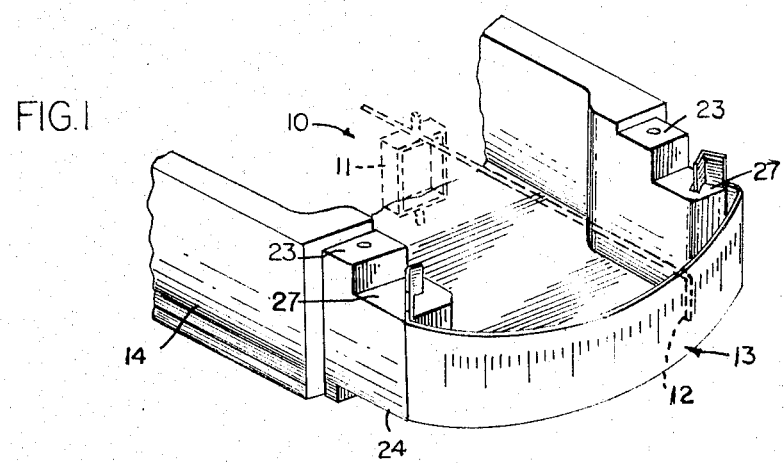
FIG. 1 is a perspective view showing a scale plate mounted with the face plate cover removed.

Referring now to FIG. 1, there is illustrated schematically a moving system 10 having a pointer 12 rotatable about the axis of coil 11. The details of the meter movement have not been illustrated since they form no part of my invention and would thus unnecessarily complicate this description. It will thus be appreciated that my invention applies equally well to a moving iron meter movement. It suffices here to say that moving system 10 rotates about a vertical axis in response to the application of the variable to be measured. The positioning of pointer 12 with respect to scale 13 thus will indicate the quantity of the variable being measured.

Figure 3:
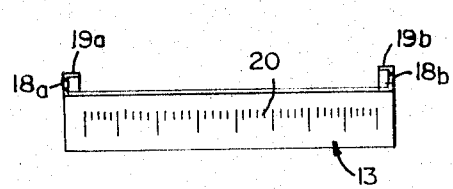
FIG. 3 is a view of the scale plate after the formation of its end portions but prior to its mounting.

Referring now to FIG. 3, there is illustrated a completed scale plate 13 having a scale-bearing portion 20 and two end portions which cooperate with slots 15a and 15b in the instrument case to form the scale-bearing portion 20 to the desired arcuate shape. The end portions are comprised of main sections 18a and 18b and terminal sections 19a and 19b. Slots 15a and 15b which cooperate with the end portions of scale plate 13 are comprised of main sections 16a and 16b and bottom sections 17a and 17b.

The mounting of scale plate 13 is accomplished by bending the scale-bearing portion 20 by exerting pressure, e.g., finger pressure, on main sections 18a and 18b so that the end portions of the scale plate may be advanced into the beginning of slots 15a and 15b. Once the leading edge of the end portions is within the slots then the scale is slid upwardly until the lower edge of each end portion of the scale plate is flush with the beginning of the slots, i.e., surface 24 on the bottom of case 14.

Figure 5:
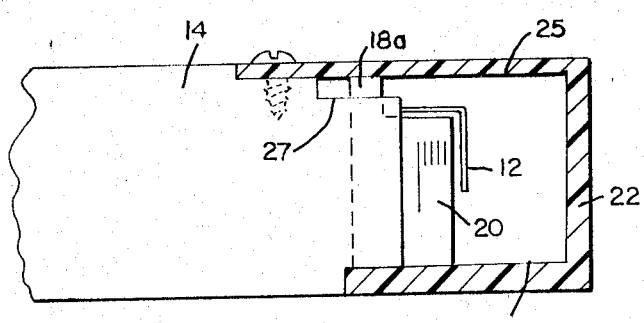
FIG. 5 is a side view of an instrument with the face plate cover, shown in section, mounted in place.

Referring now to FIG. 5, internal surface 25 of transparent scale cover 22, which has an arcuate face having an internal surface, all points of which may also be substantially equidistant from the axis of rotation of moving system 10, is brought into contact with the upper edge of both of the end portions of the instrument scale. Scale cover 22 is then slid rearwardly until surface 25 comes to rest upon surfaces 23 of each side of case 14. At the same time, the two opposed sides of transparent cover 22, which are carried rearwardly in spaced parallel alignment from the ends of the arcuate front window, will span the front of instrument case 14 and come to rest against the shoulder on each side of the case. At the same time, the bottom of cover 22 mates with the bottom of case 14 along its front edge to complete the enclosure of the front part of case 14. As may be seen by reference to FIG. 5, the dimensions of the end portions of scale 13 parallel to the axis of rotation of moving system 10 are equal to the distance between interior planar surfaces 25 and 26 of cover 22. Thus, these surfaces in cooperation with mounting surfaces 23 and 24 serve to vertically locate scale plate 13 within slots 15a and 15b. The vertical location of scale plate 13 is such that the upper edge of scale-bearing portion 20 is spaced from pointer 12 throughout its entire range of rotation.

It is another feature of this invention that pointer 12 is protected from damage during the sliding of the scale plate into the slots since the extent to which the face plate may be advanced into the slots is automatically limited by surface 24 so that the leading edge of scale-bearing portion 20 will stop before pointer 12 is contacted.

Figures 2, 4:
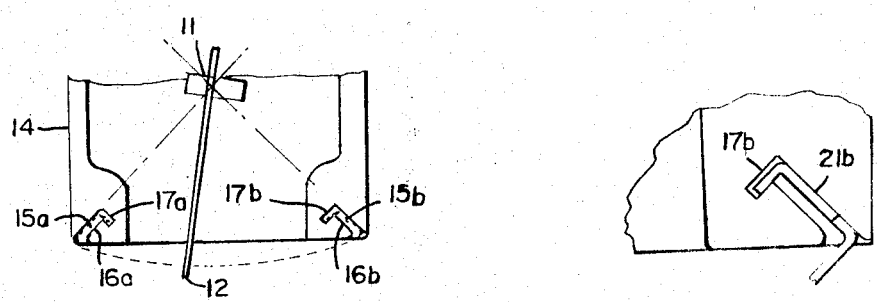
FIG. 2 is a plan view showing the relationship between the slots and the axis of rotation of the meter movement.
FIG. 4 is an enlarged view showing the final position of the end portions of the scale plate with respect to the corresponding slot.

Referring now to FIG. 4, it may be seen that the slots are slightly wider than the end portions of face plate 13 thus facilitating the sliding of the end portions of the scale plates within the corresponding slot. FIG. 4 illustrates the final resting position of main section 18b in which one of its surfaces is in contact with surface 21b of main section 16b of the slot. As is more clearly illustrated in FIG. 2, surface 21b, if extended, would intersect the axis of rotation of moving system 10. Thus, since main section 18b joins scale-bearing portion 20 at right angles, the scale bearing portion 20 will assume an arcuate shape such that all points thereon are substantially equidistant from the axis of rotation of moving system 10.

Terminal portions 19a and 19b provide means to lock the end portions of the scale plate in the slot in the position illustrated in FIG. 4 wherein the shape of scale-bearing portion 20 is controlled by the confronting relationship established between main sections 18a and 18b and opposed surfaces 21a and 21b.

Thus, in accordance with the invention, changes in the scale plate are easily accomplished by merely sliding transparent scale plate cover 22 out of engagement with the upper and lower edges of scale 13 to thus permit the scale to be slid downwardly away from scale pointer 12 until it is removed from the slots. Upon being released scale 13 should spring back to approximately its original shape if a tempered metal is used; e.g., .016" thick tempered aluminum has been found to be suitable for providing an arcuate scale plate which subtends an angle of 65°. However, it should be understood that the utilization of tempered aluminum is not essential to my invention, but it does permit the re-use of the scale plate because it will spring back to its original shape, and its resilience when it is again bent will normally still be sufficient to maintain the confronting relationship necessary for accurately maintaining the position of the scale plate. If, however, untempered aluminum were utilized, the aluminum would take a set, and if later utilized, might not exert sufficient forces to assume the desired shape or position. Furthermore, it has been found desirable to orientate the grain direction of the metal utilized so as to be longitudinal since it permits the formation of the end portions of the scale plate without cracking.

While a particular embodiment of the subject invention has been shown and described herein, it is in the nature of description rather than limitation, and it will occur to those skilled in the art that various changes, modifications, and combinations may be made within the province of the appended claims without departing either in spirit or scope from this invention in its broadest aspect.

What I claim as new and desire to secure by Letters Patent of the United States is:

1. An edgewise indicating device comprising:
   (a) a moving system including a pointer and means for rotating said pointer about an axis to define a first arc of a first radius,
   (b) means supporting said moving system having first and second angularly spaced, radially extending slots formed therein and terminated at a second radius which is less than said first radius, said radially extending slots each having a side wall extending radially from said axis, and
   (c) a normally flat resilient scale plate including a planar surface portion being divided into first and second end portions and an intermediate scale-bearing portion each including said planar surface, said scale-bearing portion dimension between said end portions equaling the arcuate length described by said second radius between said first and second side walls in said supporting means, each of said end portions adjacent said scale-bearing portion being bent so that each end portion planar surface is oriented at an angle with respect to said scale-bearing portion planar surface, said normally flat scale-bearing portion assuming an arcuate shape when said first and second end portions are disposed in said first and second radially extending slots with said planar surfaces abutting said side walls, all of said points on said scale-bearing portion planar surface being substantially equidistant from said axis.

2. The combination of claim 1 in which each of said radially extending side walls defining said slots in said supporting means lies in a plane which includes said axis, said supporting means and said scale plate end portions including means interlocking said scale plate to said supporting means.

3. An edgewise indicating device comprising:
   (a) a moving system including a pointer and means for rotating said pointer about an axis to define a first arc of a first radius,
   (b) a case supporting said moving system and having two angularly spaced slots in a front edge thereof, each of said slots having a radially extending main section defined by side walls and a bottom section located relative to each other at a first angle, said side walls terminating radially at a second radius less than said first radius, and
   (c) a normally flat resilient scale plate including a planar surface portion and being divided into first and second end portions and an intermediate scale-bearing portion each including said planar surface, said scale-bearing portion dimension between said end portions being equal to an arcuate length described by said second radius between said side walls, each end portion being bent adjacent said scale bearing portion and including a main portion and a terminal portion, said main portion located at a first angle with respect to said scale-bearing portion and said terminal portion located at a second angle with respect to said main portion, said scale plate being inserted in said slots so said main portions are inserted in said main sections and said terminal portions are disposed in said bottom sections with said planar surface abutting said side walls, said scale-bearing portion being forced into an arcuate shape when said end portions are disposed in said slots so that the points on said scale-bearing portion planar surface are substantially equidistant from said axis.

4. The combination of claim 3 in which said first angle is substantially equal to 90°, said main section of each of said slots being positioned in said case so that extensions of said main sections would intersect at said axis to thereby cause all portions of said resilient scale-bearing portion to be substantially equidistant from said axis.

5. An edgewise indicating instrument as recited in claim 3 additionally including a transparent cover covering the pointer and said scale plate, said cover having first and second planar spaced-apart portions which span the ends of said slots to thereby lock said scale plate in position of registry within said slots when it is mated with said case.

6. The combination of claim 5 in which said scale-bearing portion has a constant cross-sectional area and is formed of tempered aluminum having a longitudinal grain direction.

References Cited by the Examiner

UNITED STATES PATENTS 2,443,745  6/1948  Montgomery _____ 116—124.1

FOREIGN PATENTS 154,232  7/1932  Switzerland.

LOUIS J. CAPOZI, *Primary Examiner.*